US009445066B2

United States Patent
Inoue

(10) Patent No.: US 9,445,066 B2
(45) Date of Patent: Sep. 13, 2016

(54) PROJECTION APPARATUS, PROJECTION METHOD AND PROJECTION PROGRAM MEDIUM THAT DETERMINE A ROLL ANGLE AT WHICH THE PROJECTION APPARATUS IS TO BE TURNED TO CORRECT A PROJECTED IMAGE TO BE A RECTANGULAR IMAGE ON A PROJECTION TARGET

(71) Applicant: CASIO COMPUTER CO., LTD., Shibuya-ku, Tokyo (JP)

(72) Inventor: Hideaki Inoue, Musashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 103 days.

(21) Appl. No.: 14/221,826

(22) Filed: Mar. 21, 2014

(65) Prior Publication Data
US 2014/0285776 A1    Sep. 25, 2014

(30) Foreign Application Priority Data
Mar. 22, 2013    (JP) ................................. 2013-060753

(51) Int. Cl.
*H04N 9/31*    (2006.01)
(52) U.S. Cl.
CPC .......... *H04N 9/3185* (2013.01); *H04N 9/3191* (2013.01); *H04N 9/3194* (2013.01)
(58) Field of Classification Search
CPC . H04N 9/3185; H04N 9/3191; H04N 9/3194
See application file for complete search history.

(56) References Cited

U.S. PATENT DOCUMENTS

| 7,252,387 | B2 * | 8/2007 | Raskar ................... | G03B 21/14 348/746 |
| 8,297,757 | B2 * | 10/2012 | Kubota ................ | H04N 9/3185 353/121 |
| 8,398,246 | B2 * | 3/2013 | Rutledge ................ | G03B 21/14 353/69 |
| 8,425,050 | B2 * | 4/2013 | Furui ....................... | G03B 5/00 348/746 |
| 2006/0209268 | A1 * | 9/2006 | Raskar ................... | G03B 21/14 353/69 |
| 2007/0258055 | A1 * | 11/2007 | Shao ...................... | G03B 21/14 353/70 |
| 2008/0007700 | A1 * | 1/2008 | vanBaar ............... | H04N 9/3147 353/94 |
| 2010/0103386 | A1 * | 4/2010 | Kubota ................ | H04N 9/3185 353/70 |
| 2011/0069284 | A1 * | 3/2011 | Furui ....................... | G03B 5/00 353/70 |
| 2011/0216288 | A1 * | 9/2011 | Rutledge ................ | G03B 21/14 353/70 |

FOREIGN PATENT DOCUMENTS

JP    2001-339671 A    12/2001
JP    2008-211355 A    9/2008

* cited by examiner

*Primary Examiner* — Bao-Luan Le
(74) *Attorney, Agent, or Firm* — Holtz, Holtz & Volek PC

(57) ABSTRACT

A CPU controls an attitude adjustment unit to change the lengths of legs of an electric leg part independently of each other so that a roll angle is changed to roll a projected image, and controls an image converter to correct the projected image to be a rectangular image on a projection target based on the changed roll angle.

15 Claims, 11 Drawing Sheets

| v \ h | -30 | -25 | -20 | -15 | -10 | -5 | 0 | +5 | +10 | +15 | +20 | +25 | +30 |
|---|---|---|---|---|---|---|---|---|---|---|---|---|---|
| +30 | | | | | | | 0 | | | | | | |
| +25 | | | | | | | 0 | | | | | | |
| +20 | | | -α | | | | 0 | | | | | | |
| +15 | | | | | | | 0 | | | | | | |
| +10 | | | | | | | 0 | | | | | | |
| +5 | | | | | | | 0 | | | | | | |
| 0 | 0 | 0 | 0 | 0 | 0 | 0 | 0 | 0 | 0 | 0 | 0 | 0 | 0 |
| -5 | | | | | | | 0 | | | | | | |
| -10 | | | | | | | 0 | | | | | | |
| -15 | | | | | | | 0 | | | | | | |
| -20 | | | | | | | 0 | | | | | | |
| -25 | | | | | | | 0 | | | | | | |
| -30 | | | | | | | 0 | | | | | | |

PROJECTION APPARATUS, PROJECTION METHOD AND PROJECTION PROGRAM MEDIUM THAT DETERMINE A ROLL ANGLE AT WHICH THE PROJECTION APPARATUS IS TO BE TURNED TO CORRECT A PROJECTED IMAGE TO BE A RECTANGULAR IMAGE ON A PROJECTION TARGET

BACKGROUND

1. Technical Field

The present invention relates to a projection apparatus, a projection method and a projection program medium.

2. Related Art

There is generally known a projector that is an image projection apparatus that projects an image based on image data output from a personal computer or the like onto a projection target such as a screen.

When the optical axis of projection light of the projector is perpendicular to the projection plane of the projection target such as a screen, no distortion is caused in the projected image. If the optical axis is not perpendicular to the projection plane, however, owing to the installation angle of the projector, distortion is caused in the image.

Thus, as disclosed in JP 2001-339671 A, for example, a correction function typically called a trapezoid correction function for correcting distortion in an image is embedded in the projector. The distortion correction function is to correct distortion of a projected image on the basis of the angle (vertical angle) in the direction perpendicular to the horizontal plane of the optical axis and the angle (horizontal angle) in the horizontal direction that are obtained by a predetermined technique.

The principle of the distortion correction will be described with reference to FIG. 9. Herein, v and h are used as parameters of the angles. The angle v is an angle of a projector 1 in the direction perpendicular to the horizontal plane, and the angle h is an angle (direction) of the projector 1 in the horizontal direction. Note that a projection target (screen 2) is perpendicular to the horizontal plane. A horizontal base 3 is a base parallel to the horizontal plane. The x axis, y axis, and z axis express a projector coordinate system, in which the z axis is coincident with the optical axis of a projector optical system.

FIGS. 10A to 10C are detail views illustrating the relations between the projector coordinate system and the two angles h and v in FIG. 9 in this case.

Three solid arrows in FIG. 10A represent the projector coordinate system.

First, the projector 1 is rotated about the y axis as the rotation axis by the angle h that is a first angle in the direction of the arrows in the horizontal direction. As a result, the z axis and the x axis move to axes represented by dashed arrows.

Three solid arrows in FIG. 10B represent the projector coordinate system resulting from rotating the projector 1 by the angle h in the horizontal direction.

Next, the projector 1 is rotated about the x axis as the rotation axis by the angle v that is a second angle in the direction of the arrows in the vertical direction. As a result, the z axis and the y axis move to axes represented by dashed arrows.

Three arrows in FIG. 10C represent the projector coordinate system resulting from rotating the projector 1 first by the angle h in the horizontal direction and then by the angle v in the vertical direction. In this case, the x axis is parallel to the horizontal base 3.

As described above, the z-axis direction, that is, the optical axis direction (projecting direction) of the projector optical system can be arbitrarily changed by using the angles h and v.

When the projector 1 is placed as illustrated in FIG. 9, a projected image that is supposed to be displayed in a rectangular shape is displayed in a distorted quadrangular shape as represented by an uncorrected distorted quadrangle abcd on the screen 2.

Note that FIG. 9 illustrates a state in which the z axis of the projector 1 is first turned horizontally rightward by the angle h=30° and then turned vertically upward by the angle v=30°.

The distortion correction is a technique of setting a corrected rectangle a'b'c'd' represented by a white rectangle inside of an uncorrected distorted quadrangle abcd and performing projective transformation on input image information into the corrected rectangle a'b'c'd'.

FIG. 11 is a diagram illustrating relations between the uncorrected distorted quadrangle and the corrected rectangle before and after such distortion correction of the projector 1 as viewed on the projection plane; and FIG. 12 is a diagram illustrating such relations as viewed on the surface of an output display device (such as a micromirror display device or a liquid crystal device).

In FIG. 11, a white rectangle represents the corrected rectangle a'b'c'd', which is an image effective part. A hatched part represents an image ineffective part remaining after cutting out the corrected rectangle a'b'c'd' from the uncorrected distorted quadrangle abcd. A point k represents a position on the projection plane through which the optical axis of the projector optical system passes.

A hatched part and a white quadrangle in FIG. 12 correspond to the hatched part and the white rectangle in FIG. 11, respectively. A percentage in a white quadrangle represents the pixel usage of the output display device. The quadrangle at the center where h=v=0 represents a case in which no distortion correction is performed and the pixel usage in this case is 100%.

There are multiple cutting-out methods in distortion correction, and FIGS. 11 and 12 illustrate an example employing a cutting-out method with which the pixel usage is improved while the aspect ratio (width÷height) of the image is remained.

The specification of the projector includes the aspect ratio of the output display device being 16:9 (approximately 1.78), the throw ratio being approximately 0.92, and the position of the optical axis of the output display device being approximately 20% higher than the height of the output display device from the center of the lower side. Note that the throw ratio is expressed by (throw ratio)=(width of projected image)÷(projection distance), and that the condition of the throw ratio is when no distortion correction is conducted.

Such distortion correction as described above is based on the assumption that the balance in right and left heights of the projector 1 so that the projector 1 is installed in a state in which no roll is caused, that is, in a state in which the projector 1 is not rotating about the optical axis. Thus, if a roll is caused, the projector 1 first needs to be adjusted and set into the state in which no roll is caused before performing distortion correction. The distortion correction is therefore not very flexible.

SUMMARY

It is therefore an object of the present invention to provide a projection apparatus, a projection method and a projection program medium capable of increasing the flexibility in distortion correction.

To achieve the aforementioned and other objects, an aspect of the present invention provides a projection apparatus including: a roll angle determination unit configured to determine a roll angle at which the projection apparatus is to be turned; a roll angle changing unit configured to turn the projection apparatus at the determined roll angle; and a distortion correction unit configured to correct a projected image to be a rectangular image on a projection target based on the determined roll angle.

To achieve the aforementioned and other objects, another aspect of the present invention provides a projection method for a projection apparatus that projects an image onto a projection target, the projection method including: determining a roll angle at which the projection apparatus is to be turned; turning the projection apparatus at the determined roll angle; and correcting a projected image to be a rectangular image on the projection target based on the determined roll angle.

To achieve the aforementioned and other objects, another aspect of the present invention provides a non-transitory computer readable recording medium having a program causing a computer in a projection apparatus that projects an image onto a projection target to execute: changing a roll angle to turn the projected image; and correcting the projected image to be a rectangular image on the projection target based on the changed roll angle.

DETAILED DESCRIPTION

First Embodiment

A first embodiment will be described with reference to the drawings.

A projection apparatus according to the present embodiment employs digital light processing (DLP) (registered trademark) using a micromirror display device as an output display device.

Figure 1A:
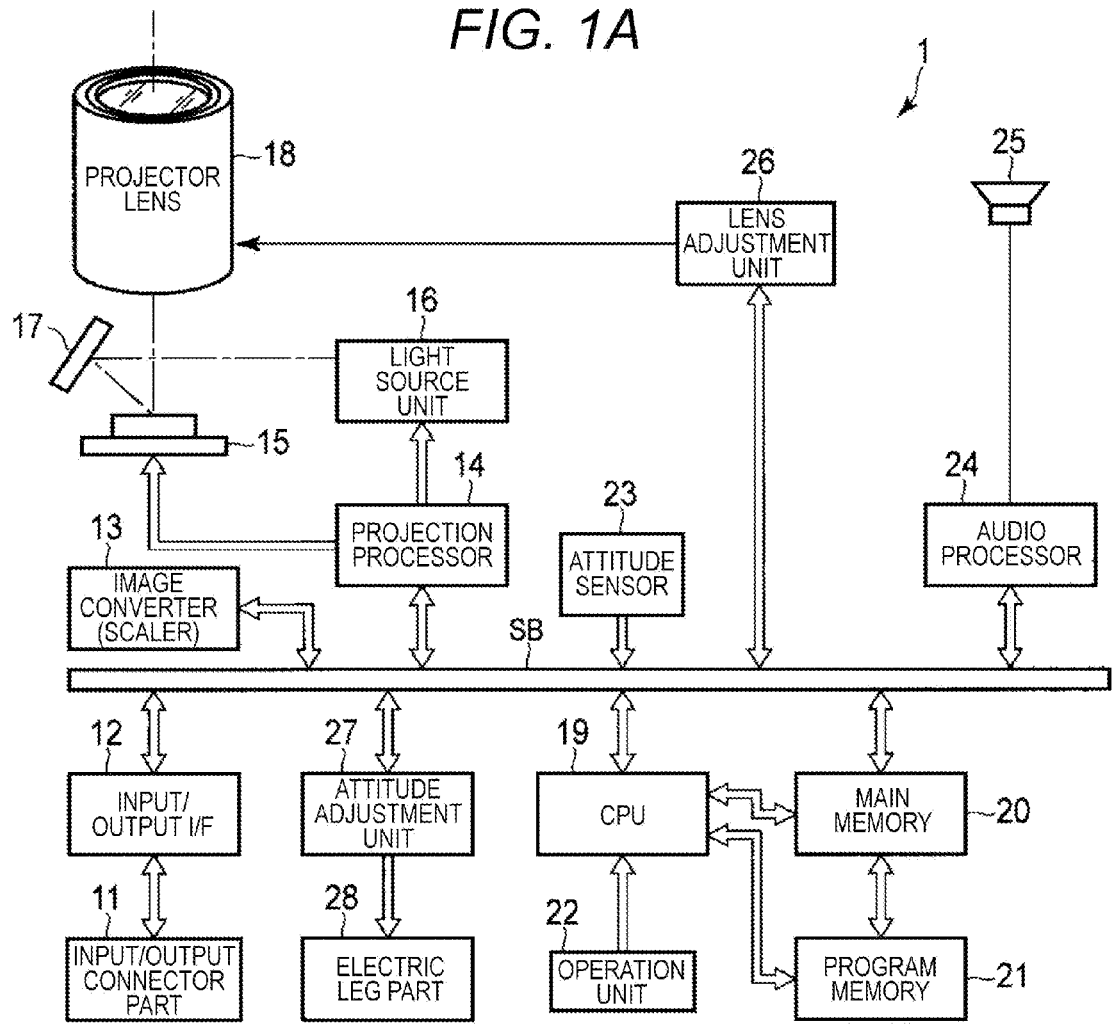
FIG. 1A is a block diagram illustrating an exemplary configuration of a projector according to a first embodiment of the present invention.

FIG. 1A illustrates an outline of a configuration of a projector 1 that is a projection apparatus according to the present embodiment. The projector 1 includes an input/output connector part 11, an input/output interface (UF) 12, an image converter 13, a projection processor 14, a micromirror device 15, a light source unit 16, a mirror 17, a projector lens 18, a CPU 19, a main memory 20, a program memory 21, an operation unit 22, an attitude sensor 23, an audio processor 24, a speaker 25, a lens adjustment unit 26, an attitude adjustment unit 27, an electric leg part 28, and a system bus SB.

The input/output connector part 11 is provided with terminals such as a pin-jack (RCA) video input terminal and a D-sub 15 RGB input terminal, and receives analog image signals as input. The input image signals are input to the image converter 13 via the input/output interface 12 and the system bus SB. Input analog image signals of various standards are converted into digital image signals.

The input/output connector part 11 may also be provided with an HDMI (registered trademark) terminal or the like and receive digital image signals as input in addition to analog image signals.

The input/output connector part 11 also receives audio signals that are analog or digital signals as input. The input audio signals are input to the audio processor 24 via the input/output interface 12 and the system bus SB.

Furthermore, the input/output connector part 11 is also provided with an RS-232C terminal and a USB terminal, for example.

The image converter 13 is also referred to as a scaler.

The image converter 13 converts input image data to adjust the resolution and the gradation thereof to generate image data in a predetermined format suitable for projection. The image converter 13 sends the converted image data to the projection processor 14. Where necessary, the image converter 13 sends image data obtained by superimposing a symbol indicating any of various operation states for on-screen display (OSD) as processed image data to the projection processor 14.

Where necessary, the image converter 13 also performs a distortion correction process of performing geometric transformation on a projected image to project the image on a projection target such as a screen in an appropriate shape depending on the projection state.

The light source unit 16 emits light rays of multiple colors including primary colors of red (R), green (G), and blue (B). The light source unit 16 is configured to emit light rays of multiple colors sequentially on a time division basis. Light emitted by the light source unit 16 is totally reflected by the mirror 17 and incident on the micromirror device 15.

The micromirror device 15 includes multiple micromirrors arranged in an array. The micromirrors are rapidly switched on and off to reflect light emitted by the light source unit 16 toward the projector lens 18 and away from the projector lens 18. The micromirror device 15 has an array of micromirrors corresponding to 1600 horizontal pixels 900 vertical pixels called HD+ or WXGA++, for example. The micromirror device 15 forms an image with HD+ resolution, for example, by reflection at the micromirrors. The micromirror device 15 thus functions as a spatial light modulation device.

The projection processor 14 drives the micromirror device 15 to display an image represented by image data sent from the image converter 13. Thus, the projection processor 14 switches the micromirrors of the micromirror device 15 on and off. Note that the projection processor 14 rapidly drives the micromirror device 15 on a time division basis. The number of divisions per unit time is a number obtained by multiplying a frame rate according to a predetermined format, such as 60 [frames/second], the number of divisions for color components, and the number of gradations for display.

The projection processor 14 also controls operation of the light source unit 16 to synchronize with the operation of the micromirror device 15. Specifically, the projection processor 14 controls the operation of the light source unit 16 to divide frames into time slots (segments) and sequentially emit light of every color component for each frame.

The projector lens 18 adjusts light guided by the micromirror device 15 to light for projection onto a projection target such as a screen 2, for example. Thus, an optical image formed by light reflected by the micromirror device 15 is projected and displayed onto the projection target such as the screen 2 via the projector lens 18.

The projector lens 18 has a zoom mechanism and thus has a function of changing the size of an image to be projected.

The projector lens 18 also has a focus adjustment mechanism to adjust the focused state of a projected image.

The projection processor 14, the micromirror device 15, the light source unit 16, the projector lens 18, and the like thus function as a projection unit configured to project an image.

The audio processor 24 includes an audio source circuit such as a PCM audio source. The audio processor 24 drives the speaker 25 to emit amplified sound on the basis of analog audio data input from the input/output connector part 11 or on the basis of a signal obtained by converting digital audio data provided at the projecting operation into analog data.

The audio processor 24 also generates a beep sound or the like where necessary.

The speaker 25 is a typical speaker that emits audio on the basis of a signal input from the audio processor 24.

The CPU 19 controls operation of the image converter 13, the projection processor 14, and the audio processor 24, as well as the lens adjustment unit 26 and the attitude adjustment unit 27.

The CPU 19 is connected to the main memory 20 and the program memory 21. The main memory 20 is an SRAM, for example. The main memory 20 functions as a working memory for the CPU 19. The program memory 21 is an electrically rewritable nonvolatile memory. The program memory 21 stores operation programs to be executed by the CPU 19 and various format data.

The CPU 19 is also connected to the operation unit 22. The operation unit 22 includes a key operation unit provided on the body of the projector 1 and an infrared ray receiving unit configured to receive infrared light from a remote controller (not illustrated) exclusively for the projector 1. The operation unit 22 outputs to the CPU 19 a key operation signal based on a key operation of the user at the key operation unit of the body or the remote controller.

The CPU 19 controls the operation of the respective components of the projector 1 in response to user's instruction from the operation unit 22 by using the programs and data stored in the main memory 20 and the program memory 21.

The attitude sensor 23 has a triaxial acceleration sensor and an orientation sensor that detects orientation, for example. The acceleration sensor detects the attitude angle of the projector 1 to the direction of gravity, that is, the pitch and roll angles thereof. The yaw angle thereof is detected as a relative bearing with respect to a reference orientation detected by the orientation sensor. The attitude sensor 23 outputs the detection result to the CPU 19.

The lens adjustment unit 26 drives the zoom mechanism of the projector lens 18 under the control of the CPU 19 in response to a zoom changing instruction made by user's operation at the operation unit 22. As a result of driving the zoom mechanism by the lens adjustment unit 26, the size of the projected image changes.

The lens adjustment unit 26 also drives a focusing lens of the projector lens 18 according to an instruction from the CPU 19.

Figure 1B:
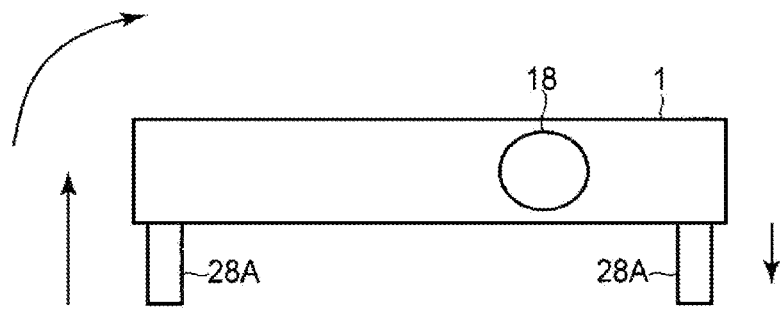
FIG. 1B is a diagram illustrating a structure of an electric leg part of the projector according to the first embodiment of the present invention.

The electric leg part 28 is to support a housing of the projector 1 and functions as an attitude and roll adjustment mechanism to change the attitude and the roll angle of the projector 1. Specifically, as illustrated in FIG. 1B, the electric leg part 28 can adjust the levelness of the projector 1 by changing the length of each leg 28A independently, and adjust the roll angle without changing the optical axis direction (projecting direction) of the projector optical system, that is, by rotating the projector 1 about the optical axis.

The attitude adjustment unit 27 drives the electric leg part 28 according to an instruction from the CPU 19.

The roll angle will be explained here.

Figure 2:
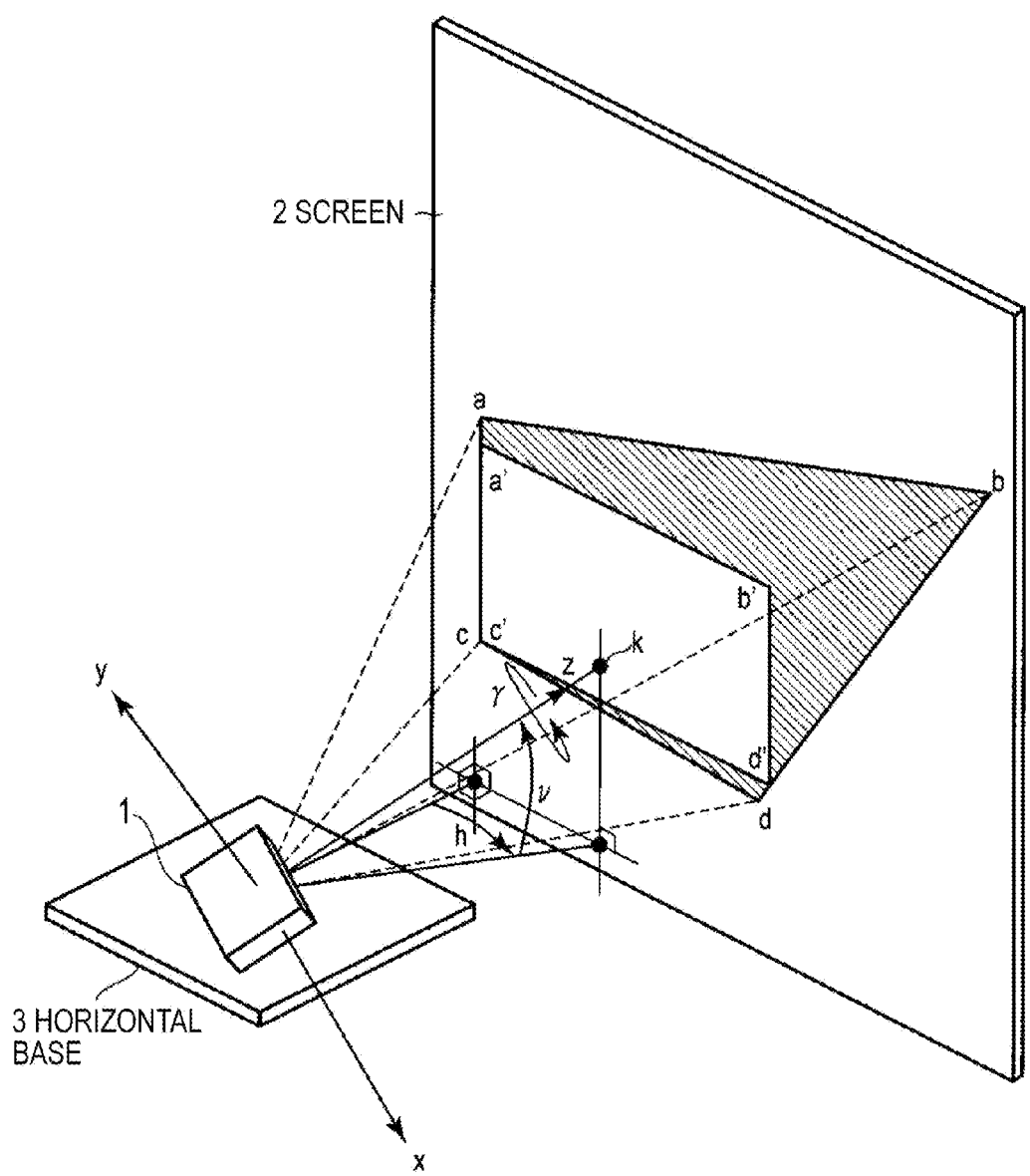
FIG. 2 is a diagram illustrating a state in which the projector is rotated about the z axis as the rotation axis by a roll angle r after the state in FIG. 9.
Figure 3A:
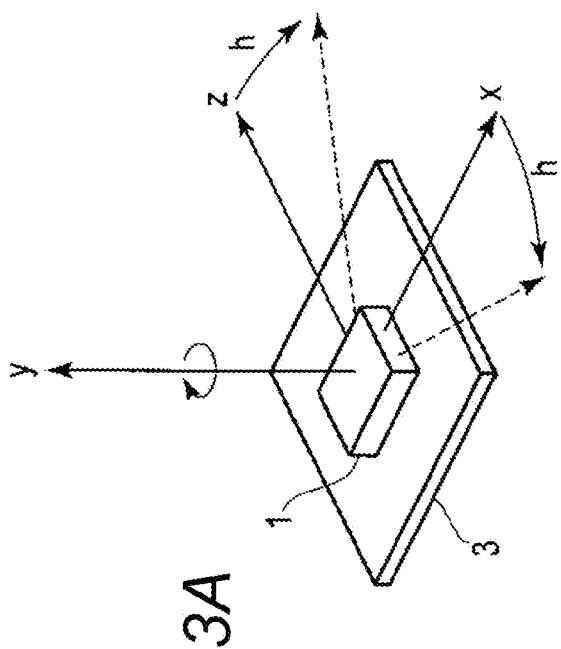
FIGS. 3A to 3D are detail views illustrating relations of a projector coordinate system in FIG. 2 and three angles h, v, and r.
Figure 3B:
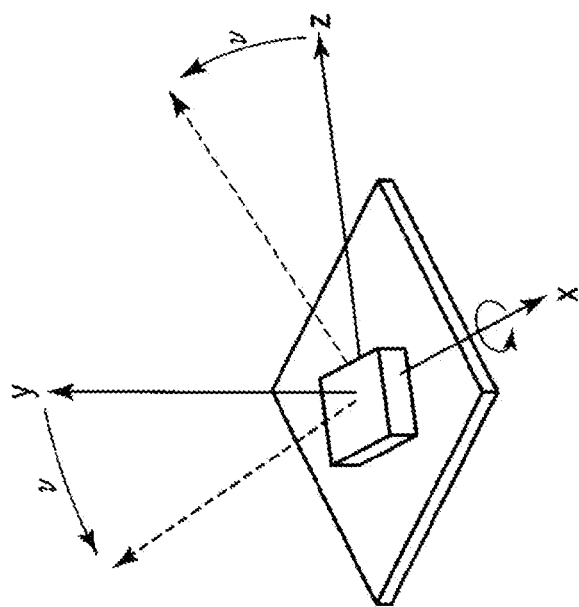
Figure 9:
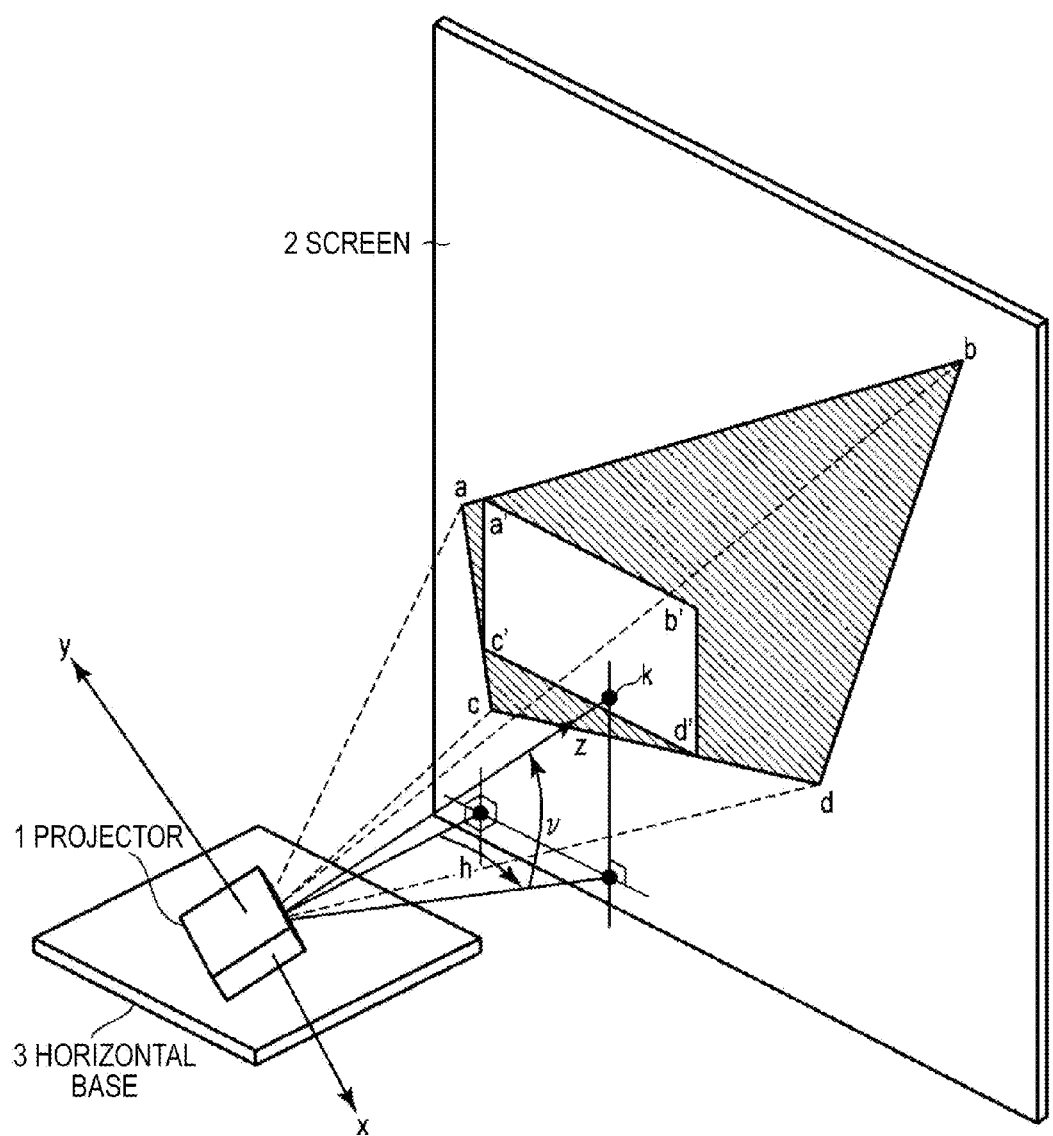
FIG. 9 is a perspective view illustrating the relation between a projector and a projection target (screen) where h=v=30°.
Figure 10B:
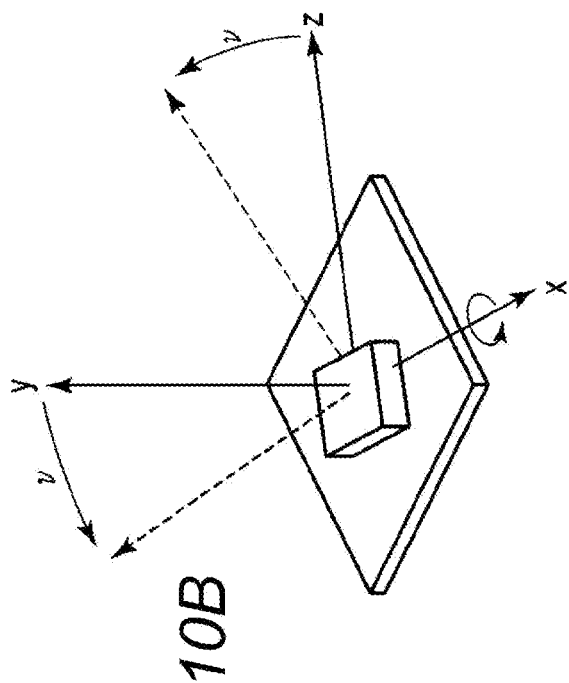
FIGS. 10A to 10C are detail views illustrating relations of a projector coordinate system in FIG. 9 and two angles h and v.
Figure 10A:
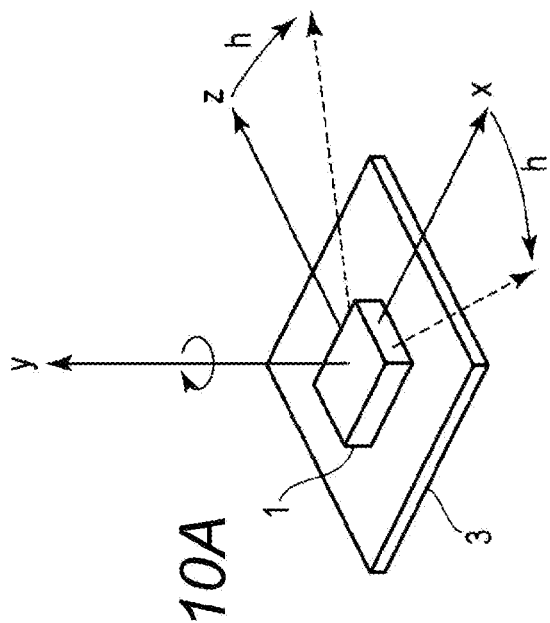
Figure 10C:
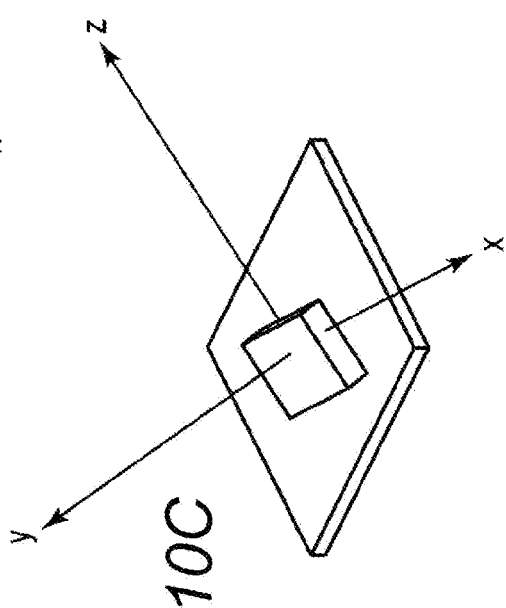

FIG. 2 illustrates a state in which the projector 1 is rotated about the z axis as the rotation axis by an angle r in the direction of the arrow after the state in FIG. 9. FIGS. 3A to 3D illustrate details thereof. Note that FIGS. 3A and 3B are the same as FIGS. 10A and 10B.

Figure 3C:
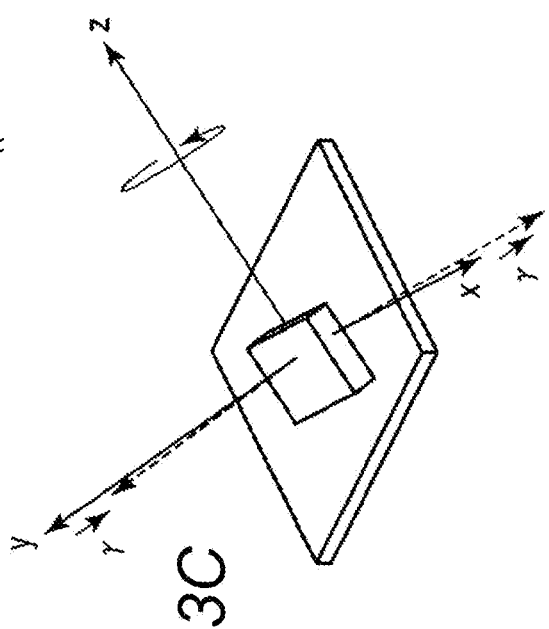

In FIG. 3C, the projector 1 is rotated about the z axis as the rotation axis in the direction of the arrow by the angle r that is a third angle. As a result, the x axis and the y axis moves to axes represented by dashed lines.

Figure 3D:
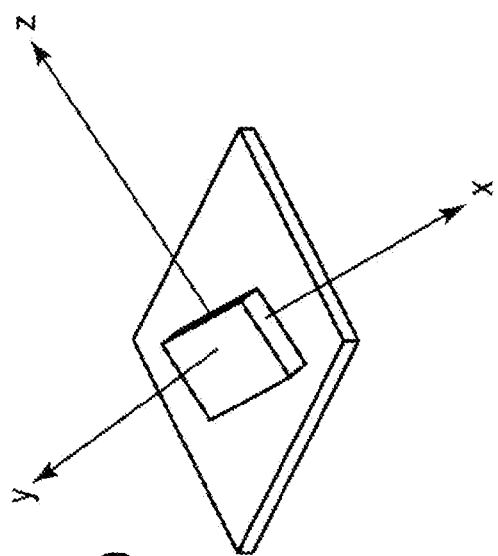

Three arrows in FIG. 3D represent the projector coordinate system after rotating the projector 1 first by the angle h in the horizontal direction, then by the angle v in the vertical direction, and further by the roll angle r. At this point, the x axis is no longer parallel to the horizontal base 3.

As a result of making the projector 1 roll in this manner, the shape of the uncorrected distorted quadrangle abcd projected on the screen 2 changes, and thus, the corrected rectangle a'b'c'd' cut out therefrom can also be changed.

The present invention focuses attention on this respect and attempts to increase the flexibility of distortion correction by positively causing a roll in contrast to the related art in which distortion correction is performed after a roll is eliminated.

For example, when an appropriate roll is caused as in FIG. 2, the shape of the uncorrected distorted quadrangle abcd changes from that in a state in which no roll is caused as in FIG. 9. It is thus possible to increase the size, change the aspect ratio, and improve the pixel usage of the corrected rectangle a'b'c'd' cut out therefrom.

The roll angle r that is the angle of the caused roll can be calculated in an unambiguous manner by combining the angles h and v in the horizontal and vertical directions of the projector 1 with respect to the screen 2. The roll angle r can be calculated by the following calculation formula (1), for example:

$$p = \arcsin(\sin h \cos v)$$
$$q = \arcsin\frac{\sin v}{\cos p}$$
$$r = \text{sgn}hv\arccos\frac{\cos q}{\cos v}.$$
(1)

In the formula (1), sgn represents a signum function, which is expressed in detail by a formula (2) below. According to the signum function sgn, the roll angle r is zero when hv=0, that is, when either one or both of the horizontal angle h and the vertical angle v is zero, the roll angle r is positive when hv>0, that is, when the horizontal angle h and the vertical angle v have the same signs, or the roll angle r is negative when hv<0, that is, when the horizontal angle h and the vertical angle v have different signs.

$$\text{sgn}x = \begin{cases} 1: x > 0 \\ 0: x = 0 \\ -1: x < 0 \end{cases}$$
(2)

According to the formula (1), the roll angle r is determined to be approximately 16.1° when h=v=30°.

Operation of the projector 1 according to the present embodiment will be described below. First, projecting operation of the projector 1 will be described.

The projecting operation is executed by the projection processor 14 under the control of the CPU 19.

Operation of the light source unit 16 is controlled by the projection processor 14. The projection processor 14 sequentially emits light rays of three colors, which are red light (R), green light (G), and blue light (B), from the light source unit 16, for example, by switching on/off of semiconductor lasers or LEDs in the light source unit 16 that emit light rays of the respective colors, and changing combination of the light sources and phosphors, or the like. The projection processor 14 make the red light, green light, and blue light sequentially enter the micromirror device 15 from the light source unit 16.

The micromirror device 15 is driven to guide incident light of each color for each micromirror (for each pixel) to the projector lens 18 for a longer time as the gradation based on image data is higher and for a shorter time as the gradation based on image data is lower. In other words, the projection processor 14 controls the micromirror device 15 so that a micromirror corresponding to a pixel with high gradation to be ON for a long time and that a micromirror corresponding to a pixel with low gradation to be OFF for a long time. In this manner, the gradation of each color of light emitted through the projector lens 18 can be expressed by each mirror (pixel).

The gradations expressed by the times during which micromirrors are ON of the respective colors are combined for each frame to express a color image.

As described above, projection light expressing an image is emitted through the projector lens 18. The color image is displayed on the screen 2 or the like by projecting the projection light onto the screen 2.

Although an example of a projector using three colors of red light, green light, and blue light is presented in the above description, a projector may be configured to emit light of complementary colors such as magenta and yellow, or white light, and combine rays of these colors to form an image.

Next, projection state adjustment according to the present embodiment will be described. The projection state adjustment is adjustment for projecting video in an undistorted rectangle shape having as large a size as possible onto a projection target such as the screen 2. The projection state adjustment is performed when the projector 1 is installed, for example.

Figure 4:
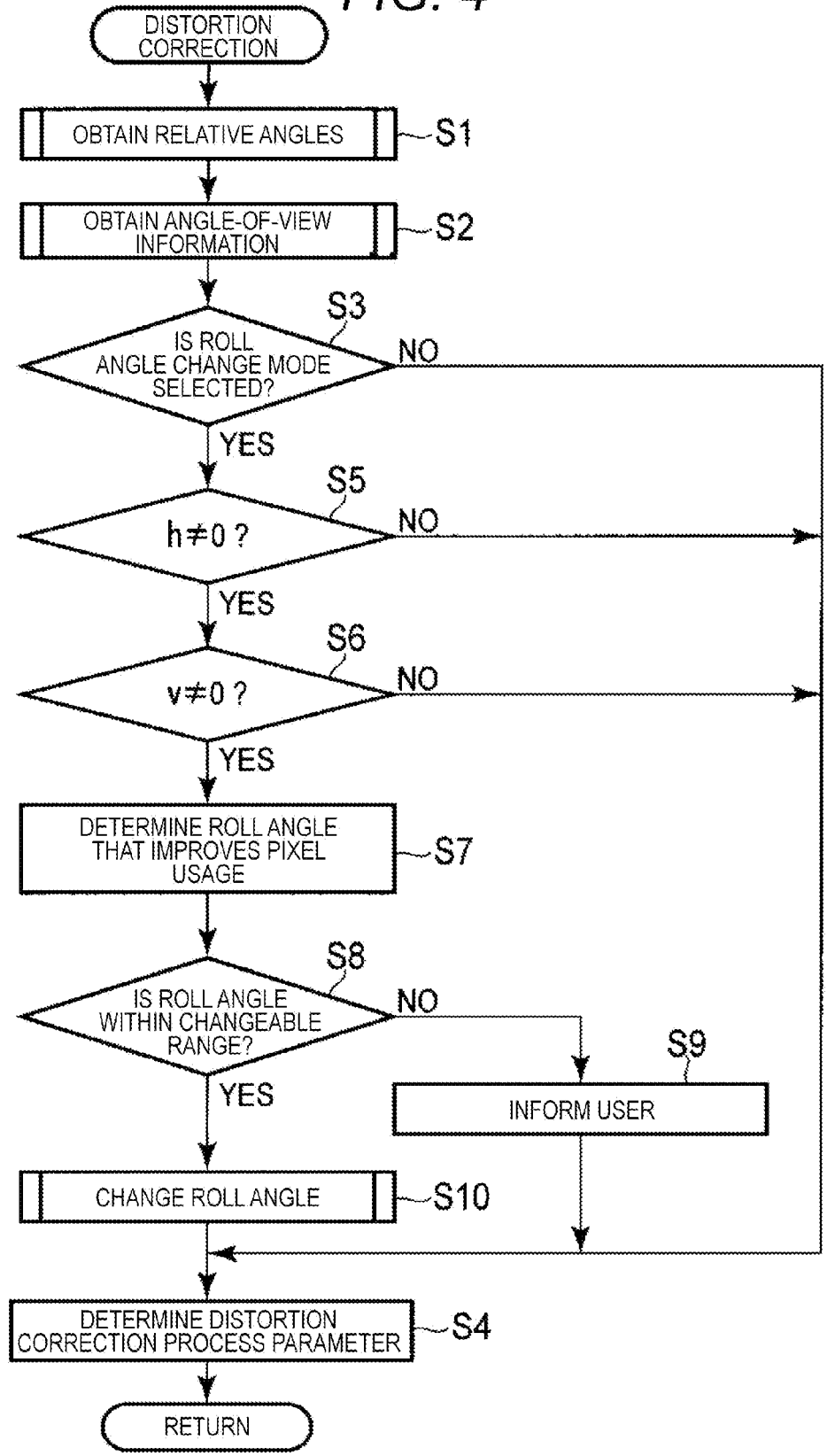
FIG. 4 is a flowchart illustrating an example of a projection state adjustment process according to the first embodiment.

FIG. 4 is a flowchart illustrating an example of a projection state adjustment process according to the present embodiment.

The projector 1 stores a program corresponding to this flowchart as part of projection programs to be executed by the CPU 19 in the program memory 21.

In step S1, the CPU 19 obtains relative angles between the projector 1 and the screen 2. Specifically, for installing the projector 1 on the horizontal base 3, a user normally places the projector 1 in parallel with the screen 2, turns the projector 1 on, and changes and corrects the attitude of the projector 1 so that light emitted through the projector lens 18 is projected onto the screen 2. The CPU 19 can obtain the relative angles between the projector 1 and the screen 2 by detecting the motion of the projector 1 in the operation for changing the attitude of the projector 1 by the attitude sensor 23.

Subsequently, in step S2, the CPU 19 obtains angle-of-view information (projector specification). Examples of the angle-of-view information include the throw ratio, the zoom value, and the lens shift amount. The CPU 19 can obtain the angle-of-view information by measurement using a sensor that is not illustrated, by reading out a value stored as a preset value for the projector in the program memory 21 or a value changed by the user operation, or the like.

After the CPU 19 has obtained the relative angles between the projector 1 and the screen 2 and the angle-of-view information in this manner, the CPU 19 then determines whether or not a roll angle change mode is selected as an operation mode set by the user by using the operation unit 22 in step S3. If it is determined that the roll angle change mode is not selected, the process proceeds to step S4.

In step S4, the CPU 19 determines (recognizes) the shape of the uncorrected distorted quadrangle abcd on the basis of the obtained relative angles and angle-of-view information, and determines a distortion correction process parameter for geometrical correction at the image converter 13 so that the projected image becomes a rectangular image on the screen 2. While there are multiple cutting-out methods in distortion correction, a cutting-out method that improves the pixel usage while maintaining the aspect ratio of the image is employed here.

Then, the projection state adjustment process is terminated. Subsequently, the image converter 13 will perform the geometrical correction based on the determined distortion correction process parameter on an input image to project an image subjected to distortion correction.

If, on the other hand, it is determined in step S3 that the roll angle change mode is selected, the process proceeds to step S5. In step S5, the CPU 19 determines whether or not the angle h in the horizontal direction of the relative angles obtained in step S1 is zero.

If the angle h in the horizontal direction is zero, the process proceeds to step S4, where the distortion correction process parameter based on the relative angles and the angle-of-view information is determined.

In contrast, if the angle h in the horizontal direction is determined not to be zero in step S5, the process proceeds to step S6. In step S6, the CPU 19 determines whether or not the angle v in the vertical direction of the relative angles obtained in step S1 is zero.

If the angle v in the vertical direction is determined to be zero, the process proceeds to step S4, where the distortion correction process parameter based on the relative angles and the angle-of-view information is determined.

If the angle v in the vertical direction is determined not to be zero in step S6, that is, if both of the angles h and v in the horizontal and vertical directions are determined not to be zero, the process proceeds to step S7.

In step S7, the CPU 19 determines a roll angle r that improves the pixel usage by using the formula (1) described above, for example. Thereafter, in step S8, the CPU 19 determines whether or not the determined roll angle r is within such a range that the electric leg part 28 can change.

If the roll angle r is determined not to be within the changeable range, the process proceeds to step S9. In step S9, the CPU 19 informs the user that the roll angle cannot be changed. The CPU 19 informs the user of the information by controlling the audio processor 24 to emit an alarm sound through the speaker 25, or by controlling the image converter 13 to generate image data on which a warning symbol is superimposed as an OSD and to project the image data onto the screen 2, for example.

The process then proceeds to step S4, where the distortion correction process parameter on the basis of the relative angles is determined.

If, on the other hand, the roll angle r is determined to be within the changeable range in step S8, the process proceeds to step S10. In step S10, the CPU 19 makes the attitude adjustment unit 27 drive the electric leg part 28 to change the roll angle of the projector 1 according to the roll angle r determined in step S7.

Thereafter, the process proceeds to step S4, where the distortion correction process parameter is determined. In this case, however, the shape of the uncorrected distorted quadrangle abcd is determined on the basis of the roll angle in addition to the relative angles and the angle-of-view information to determine the distortion correction process parameter.

Figure 5:
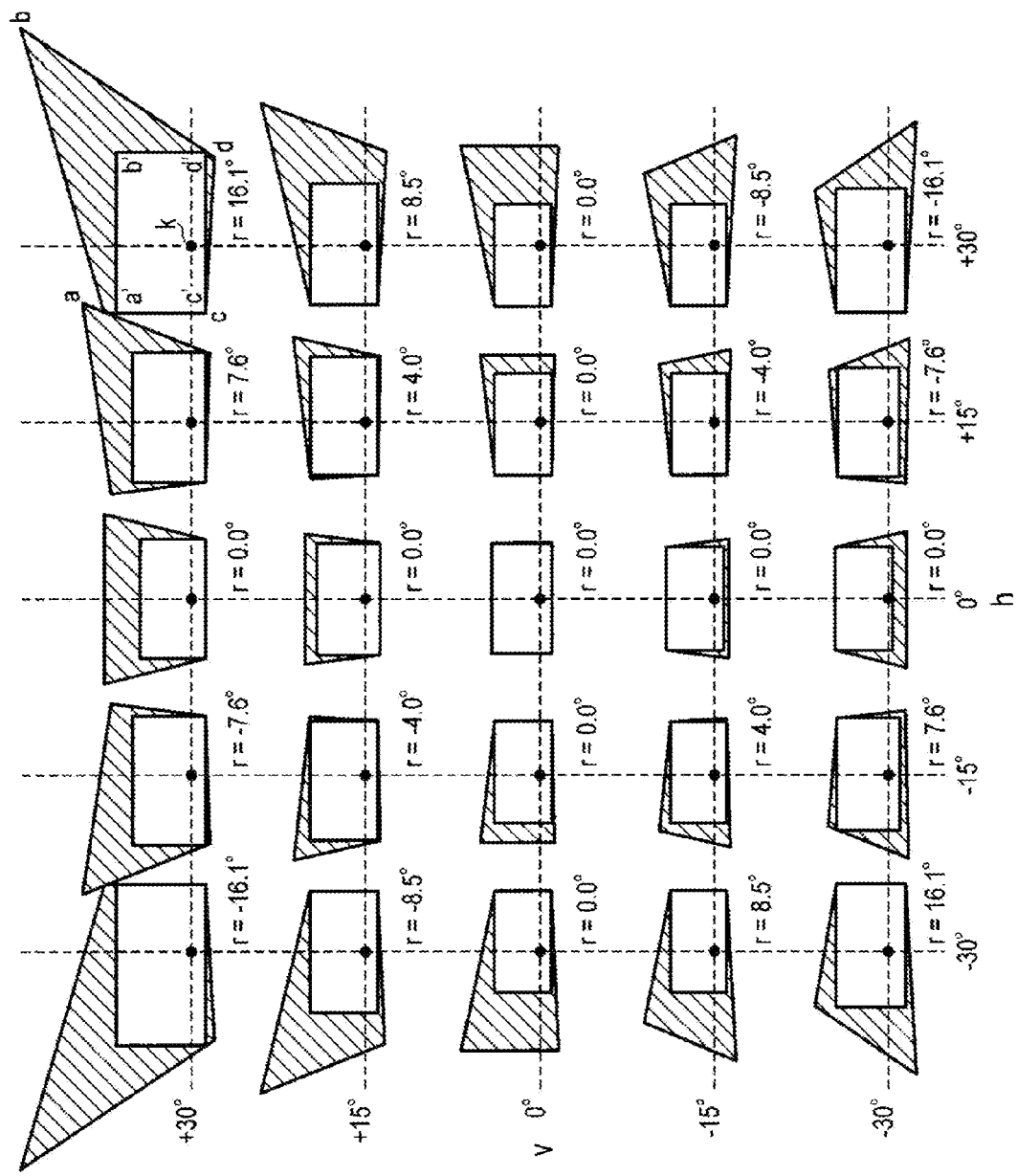
FIG. 5 is a diagram illustrating relations between an uncorrected distorted quadrangle and a corrected rectangle before and after distortion correction of the projector according to the first embodiment as viewed on the projection plane.
Figure 6:
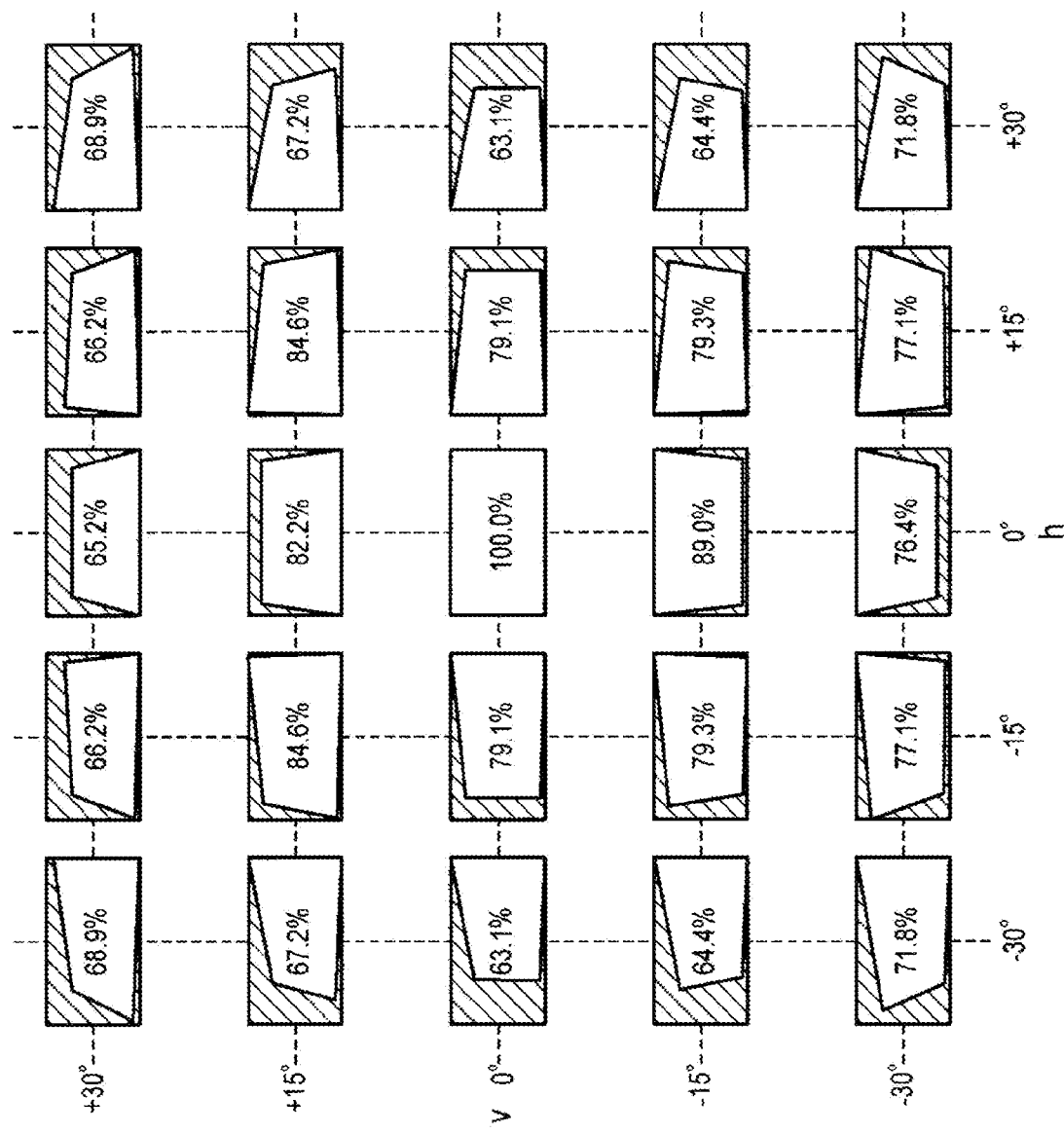
FIG. 6 is a diagram illustrating the relations between the uncorrected distorted quadrangle and the corrected rectangle before and after distortion correction of the projector according to the first embodiment as viewed on the surface of an output display device.
Figure 11:
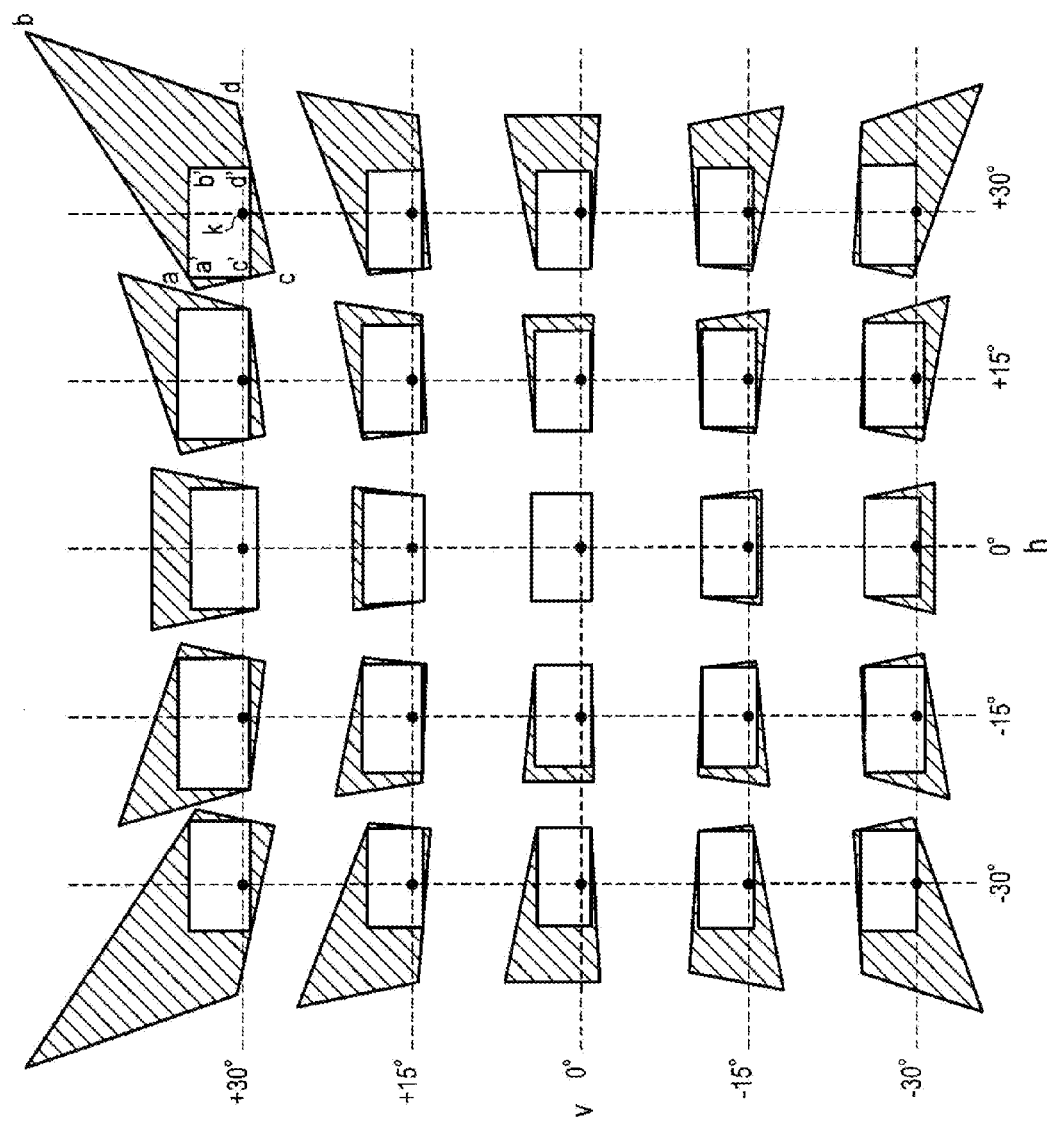
FIG. 11 is a diagram illustrating relations between an uncorrected distorted quadrangle and a corrected rectangle before and after distortion correction of the projector as viewed on the projection plane.

FIG. 5 is a diagram illustrating relations between the uncorrected distorted quadrangle abcd and the corrected rectangle a'b'c'd' before and after distortion correction of the projector 1 according to the present embodiment as viewed on the projection plane, and FIG. 6 is a diagram illustrating the relations as viewed on the surface of an output display device. FIGS. 5 and 6 illustrate cases in which the projector specification is the same as that in FIGS. 11 and 12 and in which the cut-out position of the corrected rectangle is determined so that the pixel usage is maximum, for example. Note that the values of r in FIG. 5 are the respective roll angles r.

Figure 12:
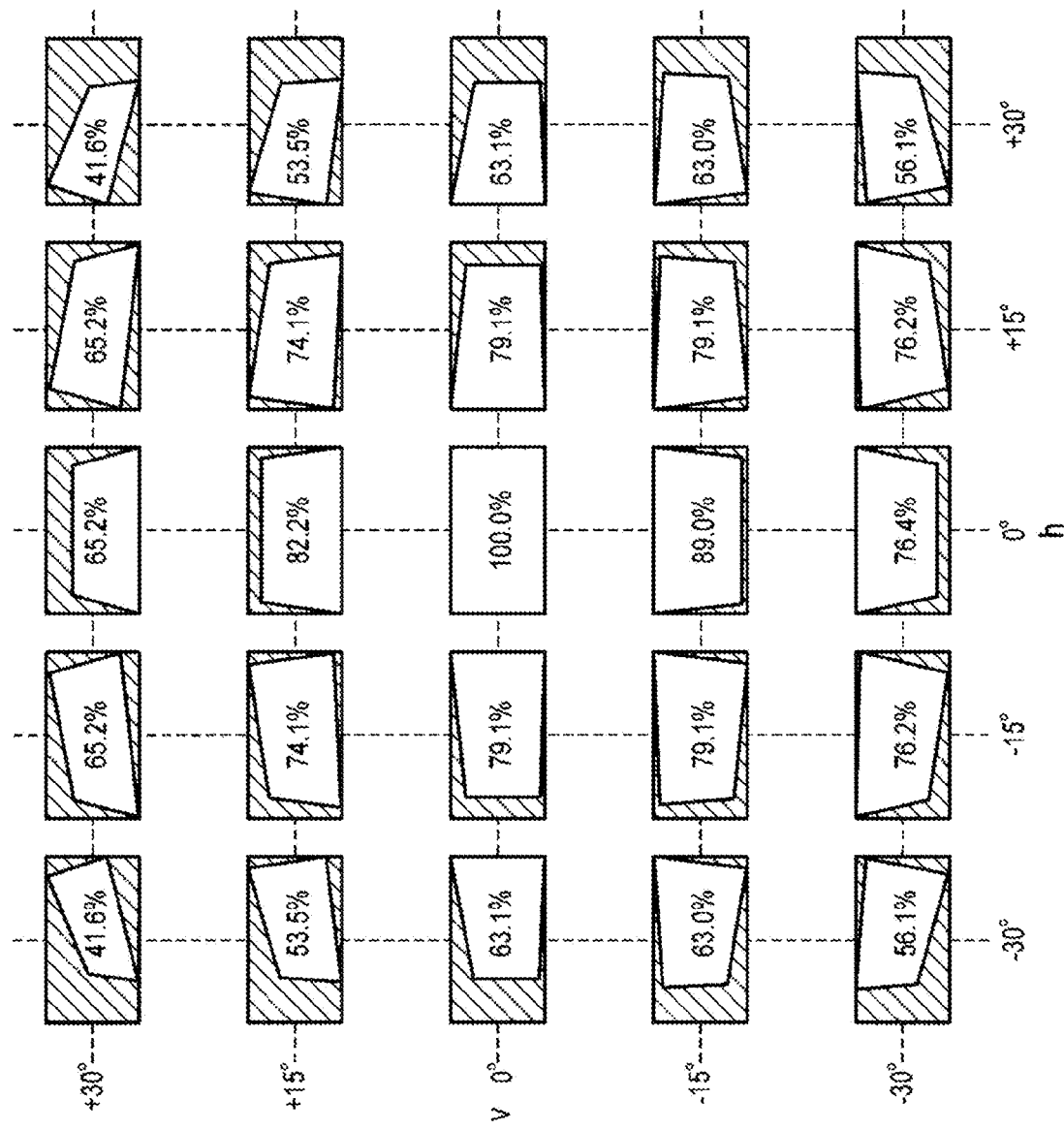
FIG. 12 is a diagram illustrating the relations between the uncorrected distorted quadrangle and the corrected rectangle before and after distortion correction of the projector as viewed on the surface of an output display device.

According to the present embodiment, comparison between FIG. 6 and FIG. 12 shows that the pixel usage is improved when the horizontal angle h is not zero and the vertical angle v is not zero. For example, the pixel usage where h=v=30° is improved to 68.9% in FIG. 6 of the present embodiment as compared to 41.6% in FIG. 12 of the related art.

When the distortion correction process is performed at the image converter 13, there may be a limit in applying the difference in height between the upper-left vertex and the upper-right vertex and the difference in height between the lower-left vertex and the lower-right vertex of the corrected rectangle a'b'c'd on the output display device.

According to the first embodiment, the roll angle of the projected image is positively changed so that the roll angle is larger, and the changed roll angle is taken into account (reflected) to be the distortion correction performed so that the projected image will be a rectangular image on the screen 2. Thus, since the differences in height become smaller according to the first embodiment, the range of correction based on the relative angles may be widened. Thus, according to the present embodiment, the flexibility in distortion correction can be improved. Furthermore, the range of distortion correction based on the relative angles can be widened.

Furthermore, since the CPU 19 performs the distortion correction to improve the pixel usage of the output display device of the projector 1, projection with an increased pixel usage (with higher brightness and higher resolution) can be achieved.

Moreover, since the CPU 19 obtains the relative angles between the projector 1 and the screen 2, determines the roll angle to change to on the basis of the obtained relative angles, and changes the roll angle to the determined angle in the distortion correction process, a proper roll angle can be determined.

Still further, since the CPU 19 determines the roll angle to change to and changes the roll angle to the determined angle when neither of the vertical and horizontal angles of the relative angles is zero, the load on the CPU 19 can be lowered by performing calculation of the roll angle only when necessary.

Furthermore, according to the first embodiment, since the roll angle r to change to is determined by using an arithmetic expression, a proper roll angle can be easily calculated.

Furthermore, according to the first embodiment, since the roll angle is changed such that the optical axis of a projected image is unchanged, projection with corrected distortion can be performed without changing the projection position on the screen.

Furthermore, according to the first embodiment, since the electric leg part 28 supporting the housing of the projector 1 is controlled to change the roll angle of a projected image, the roll angle can be changed at the housing without changing the design of the projector body.

Furthermore, according to the first embodiment, since distortion correction is performed such that the aspect ratio of an original image is maintained, it is possible to allow the user to select the aspect ratio of the image in advance and perform projection with corrected distortion.

Furthermore, according to the first embodiment, since a mode in which the roll angle is not changed is further included, it is possible to select and use the distortion projection without correcting the roll as in the related art.

Furthermore, according to the first embodiment, since the relative angles with respect to the screen 2 are obtained on the basis of a result of detection by the attitude sensor 23, the CPU 19 can readily obtain appropriate relative angles without measuring the distances or the like.

Furthermore, according to the first embodiment, since the user is informed of the information when the determined roll angle exceeds the changeable range, the usability for the user can be improved.

Second Embodiment

While the roll angle is changed by using the electric leg part 28 in the first embodiment, the roll angle changing mechanism is not limited thereto.

Figures 7, 8:
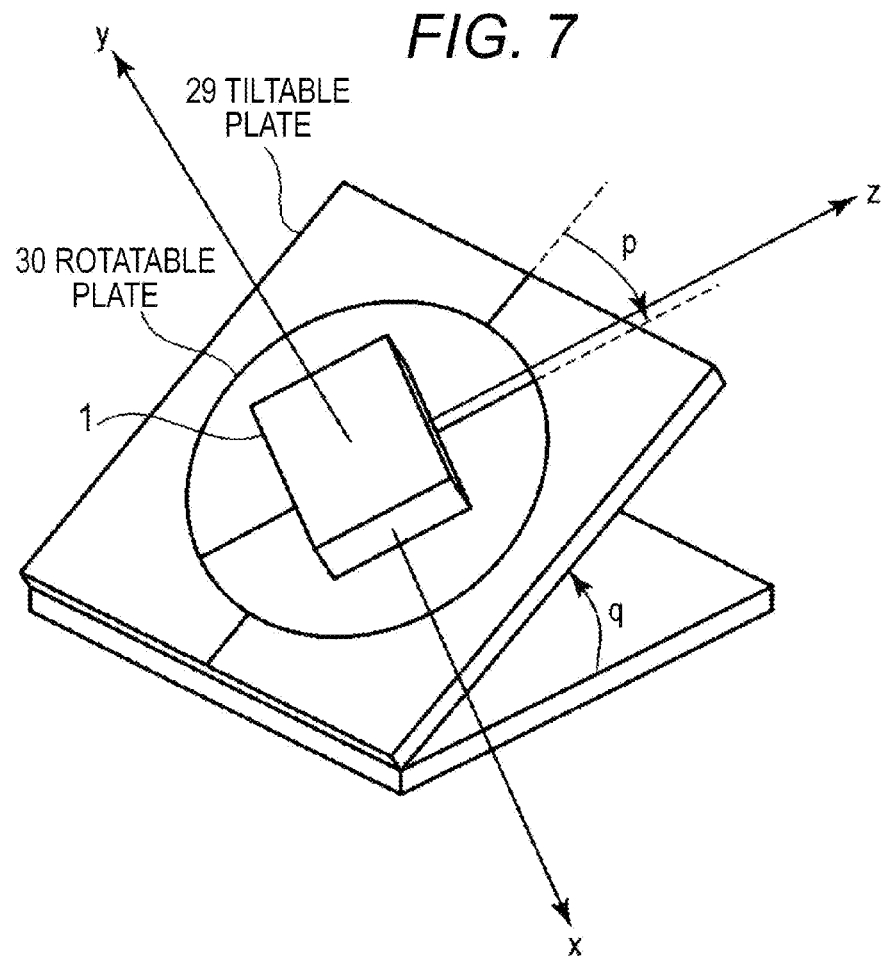
FIG. 7 is a diagram illustrating an example of a roll angle changing mechanism according to the first embodiment of the present invention.
FIG. 8 is an example of an optimum roll angle look-up table.

For example, as illustrated in FIG. 7, the projector 1 may be placed on a rotatable plate 30 provided on a tiltable plate 29. In FIG. 7, p represents an angle of rotation (the angle in the yaw direction) of the rotatable plate 30, and q represents an angle of inclination (the angle in the pitch direction) of the tiltable plate 29. These p and q correspond to p and q, respectively, in the formula (1). In this case, the roll angle can be automatically applied, and control and drive for changing the roll angle are thus unnecessary. Note that, in FIG. 7, the screen is placed such that the z axis of the projector coordinate system is perpendicular to the screen when $p=q=0$.

Thus, the projector coordinate system in FIG. 7 is equivalent to that in FIG. 3D that is a projector coordinate system after first changing the horizontal angle, then changing the vertical angle, and finally changing the roll angle. Specifically, the directions of three axes of the projector coordinate system when $p\approx25.7°$ and $q\approx33.7°$ in FIG. 7 are the same as those of three axes of the projector coordinate system, respectively, when $h=v=30°$ and $r\approx16.1°$ in FIG. 3.

Thus, according to the second embodiment, p and q can directly detected by a sensor or the like and the distortion correction process parameter can be determined easily.

Furthermore, the roll angle can be changed without changing the design of the projector 1.

While the present invention has been described by way of certain embodiments, the present invention is not limited to the embodiments described above but can be embodied with components modified without departing from the scope of the invention in carrying out the invention.

For example, the roll angle changing mechanism can employ various techniques such as a rotation mechanism configured to electrically rotate the output display device in the projector about the optical axis instead of changing the attitude of the entire projector 1. As a result of changing the roll angle of a projected image by using the rotation mechanism configured to rotate the output display device about the optical axis, the roll angle can be changed inside of the housing of the projector 1. Note that, with the configuration of the rotation mechanism or the like mentioned above, it is possible to keep the optical axis position unchanged in changing the roll angle.

Furthermore, it is also desirable to keep the optical axis position unchanged when the roll angle is changed with the configuration as illustrated in FIG. 1B or in FIG. 7.

In changing the roll angle with such a configuration as in FIG. 1B, when one of the left and right legs is extended, for example, the optical axis position can be kept unchanged by making the other leg retract appropriately on the basis of the optical axis position in the lateral direction.

It is, however, not essential to keep the optical axis position unchanged in changing the roll angle.

A configuration in which such roll angle changing mechanisms can be combined may be used.

Furthermore, regarding the method for obtaining the relative angles between the projector 1 and the screen 2, the relative angles can be obtained by a known multipoint ranging technique, that is, by measuring the distances to multiple points (three or more points that are not on one straight line) on the screen 2 without using the attitude sensor 23. The method for measuring the distances may be any known technique such as one using ultrasound waves or infrared rays. As a result of obtaining the relative angles with respect to the screen 2 on the basis of a result of measurement by a ranging unit, the relative angles can be appropriately obtained.

Alternatively, various techniques can be employed as another method for obtaining the relative angles, such as a method of projecting a test chart and obtaining the relative angles on the basis of image data obtained by capturing the test chart or a method of measuring the relative angles and inputting the measurement result to the operation unit 22 by the user.

Furthermore, the formula (1) (and the formula (2)) is not a formula for obtaining an optimum roll angle but a formula for easily obtaining a better solution. It is needless to say that the present invention can use other calculation formulae.

For obtaining an optimum roll angle, such an optimum roll angle can be obtained for each set of relative angles with the screen 2 in advance or by a sequential/round-robin method (for example, a method of searching for an angle at which the pixel usage is maximum at 0.5-degree intervals within a controllable range). As a result of searching for the roll angle to change to, determining and changing the roll angle in this manner, the optimum roll angle can be determined.

Furthermore, such values found in advance maybe stored in a form of a look-up table as illustrated in FIG. 8, for example, in the program memory 21, so that the roll angle can be determined by referring to the look-up table. As a result of storing a roll angle to change to for each set of relative angles, determining the roll angle to change to by referring to the stored information, and changing the roll angle in this manner, an optimum roll angle can be readily determined.

While an example in which the distortion correction is performed such that the aspect ratio of an original image is maintained has been described, it is needless to say that correction can also be made such that a change in the aspect ratio of an original image is permitted. When correction is made in such a manner that a change in the aspect ratio of an original image is permitted, the user may be made to select a mode on whether or not to change the aspect ratio of the image in advance.

Furthermore, the features disclosed in the embodiment described above can be combined as appropriate to make various inventions. For example, if the problems mentioned above can be solved and the advantageous effects of the invention can be produced without some of the features presented in the embodiments, a configuration without the features can be extracted as an invention.

Furthermore, components of different embodiments may be combined where appropriate.

What is claimed is:

1. A projection apparatus comprising:
   a roll angle determination unit configured to determine a roll angle at which the projection apparatus is to be turned;
   a roll angle changing unit configured to turn the projection apparatus at the determined roll angle;
   a distortion correction unit configured to correct a projected image to be a rectangular image on a projection target based on the determined roll angle; and
   an obtaining unit configured to obtain relative angles between the projection apparatus and the projection target;
   wherein the roll angle determination unit determines the roll angle based on the obtained relative angles; and wherein when a horizontal angle and a vertical angle of the relative angles are represented by h and v, respectively, and the roll angle is represented by r, the roll angle determination unit determines the roll angle r by using:

$$p = \arcsin(\sin h \cos v)$$
$$q = \arcsin\frac{\sin v}{\cos p}$$
$$r = \operatorname{sgn} h v \arccos\frac{\cos q}{\cos v}$$

where $$\operatorname{sgn} x = \begin{cases} 1: x > 0 \\ 0: x = 0 \\ -1: x < 0 \end{cases}.$$

2. The projection apparatus according to claim 1, wherein the roll angle changing unit changes the roll angle without changing an optical axis of a projected image.

3. The projection apparatus according to claim 1, further comprising an electric leg part configured to support a housing of the projection apparatus, wherein the roll angle changing unit controls the electric leg part to change the roll angle.

4. The projection apparatus according to claim 1, further comprising a rotating unit configured to rotate an output display device of the projection apparatus about an optical axis, wherein the roll angle changing unit changes the roll angle by using the rotating unit.

5. The projection apparatus according to claim 1, further comprising an informing unit configured to inform a user that the roll angle determined by the roll angle determination unit is beyond a changeable range when the roll angle is beyond the changeable range.

6. The projection apparatus according to claim 1, wherein the distortion correction unit performs correction to improve a pixel usage of an output display device of the projection apparatus.

7. The projection apparatus according to claim 1, wherein the distortion correction unit performs correction such that an aspect ratio of an original image is maintained.

8. The projection apparatus according to claim 1, wherein the distortion correction unit performs correction such that a change in an aspect ratio of an original image is permitted.

9. The projection apparatus according to claim 1, wherein the distortion correction unit includes a mode in which the roll angle is not changed.

10. The projection apparatus according to claim 1, wherein the roll angle determination unit determines the roll angle when none of vertical and horizontal angles that are the relative angles is zero.

11. A projection method for a projection apparatus that projects an image onto a projection target, the projection method comprising:
obtaining relative angles between the projection apparatus and the projection target;
storing roll angle information for the relative angles;
determining a roll angle at which the projection apparatus is to be turned based on the obtained relative angles and the stored roll angle information;
turning the projection apparatus at the determined roll angle; and
correcting a projected image to be a rectangular image on the projection target based on the determined roll angle;
wherein when a horizontal angle and a vertical angle of the relative angles are represented by h and v, respectively, and the roll angle is represented by r, the roll angle r is determined by using:

$$p = \arcsin(\sin h \cos v)$$
$$q = \arcsin\frac{\sin v}{\cos p}$$
$$r = \operatorname{sgn} h v \arccos\frac{\cos q}{\cos v}$$

where $$\operatorname{sgn} x = \begin{cases} 1: x > 0 \\ 0: x = 0 \\ -1: x < 0 \end{cases}.$$

12. The projection method according to claim 11, wherein turning the projection apparatus comprises turning the projection apparatus using a roll base on which the projection apparatus is placed.

13. The projection method according to claim 12, wherein the roll base is configured to adjust angles of the projection apparatus in a yaw direction and in a pitch direction.

14. The projection method according to claim 11, wherein turning the projection apparatus is performed without changing an optical axis of a projected image.

15. A non-transitory computer readable recording medium having stored thereon a program for controlling a computer in a projection apparatus that projects an image onto a projection target to execute operations comprising:
obtaining relative angles between the projection apparatus and the projection target;
determining a roll angle at which the projection apparatus is to be turned based on the obtained relative angles and stored roll angle information for the relative angles;
changing the roll angle to turn the projected image; and
correcting the projected image to be a rectangular image on the projection target based on the changed roll angle;
wherein when a horizontal angle and a vertical angle of the relative angles are represented by h and v, respectively, and the roll angle is represented by r, the roll angle r is determined by using:

$$p = \arcsin(\sin h \cos v)$$
$$q = \arcsin\frac{\sin v}{\cos p}$$
$$r = \operatorname{sgn} h v \arccos\frac{\cos q}{\cos v}$$

where $$\operatorname{sgn} x = \begin{cases} 1: x > 0 \\ 0: x = 0 \\ -1: x < 0 \end{cases}.$$

* * * * *